July 2, 1957 L. SERVANTY 2,797,882
AIRCRAFT CONTROL SYSTEM

Filed June 4, 1952 5 Sheets-Sheet 1

Lucien Servanty
By Fraser, Myers & Manley
Att'ys.

July 2, 1957 L. SERVANTY 2,797,882
AIRCRAFT CONTROL SYSTEM
Filed June 4, 1952 5 Sheets-Sheet 2
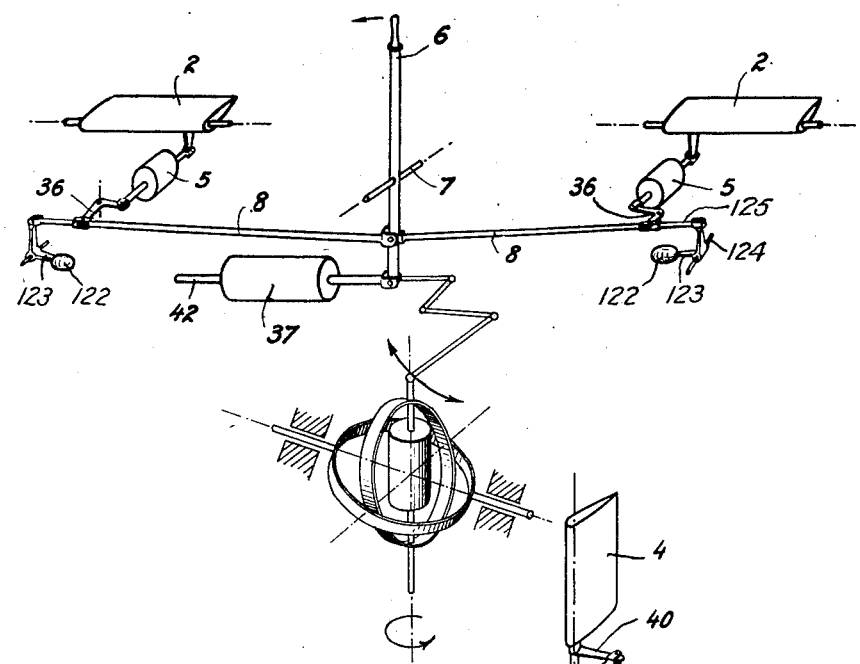
Fig.3
Fig.4
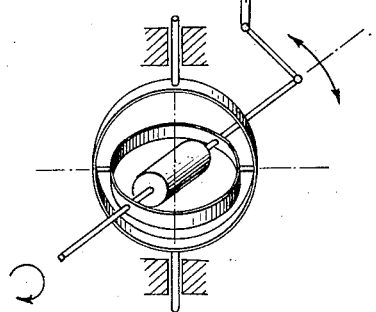
Lucien Servanty
By Fraser, Myers + Manley
Att'ys.

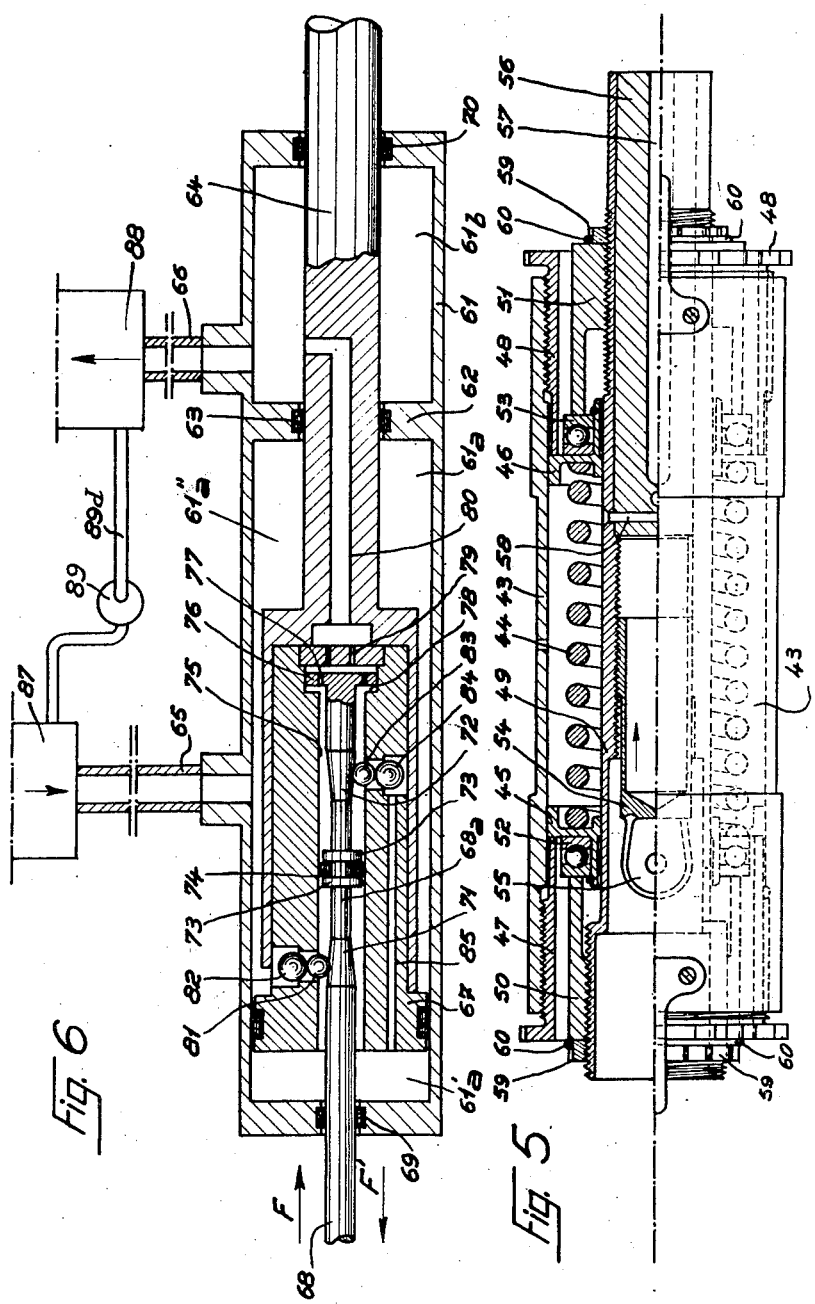

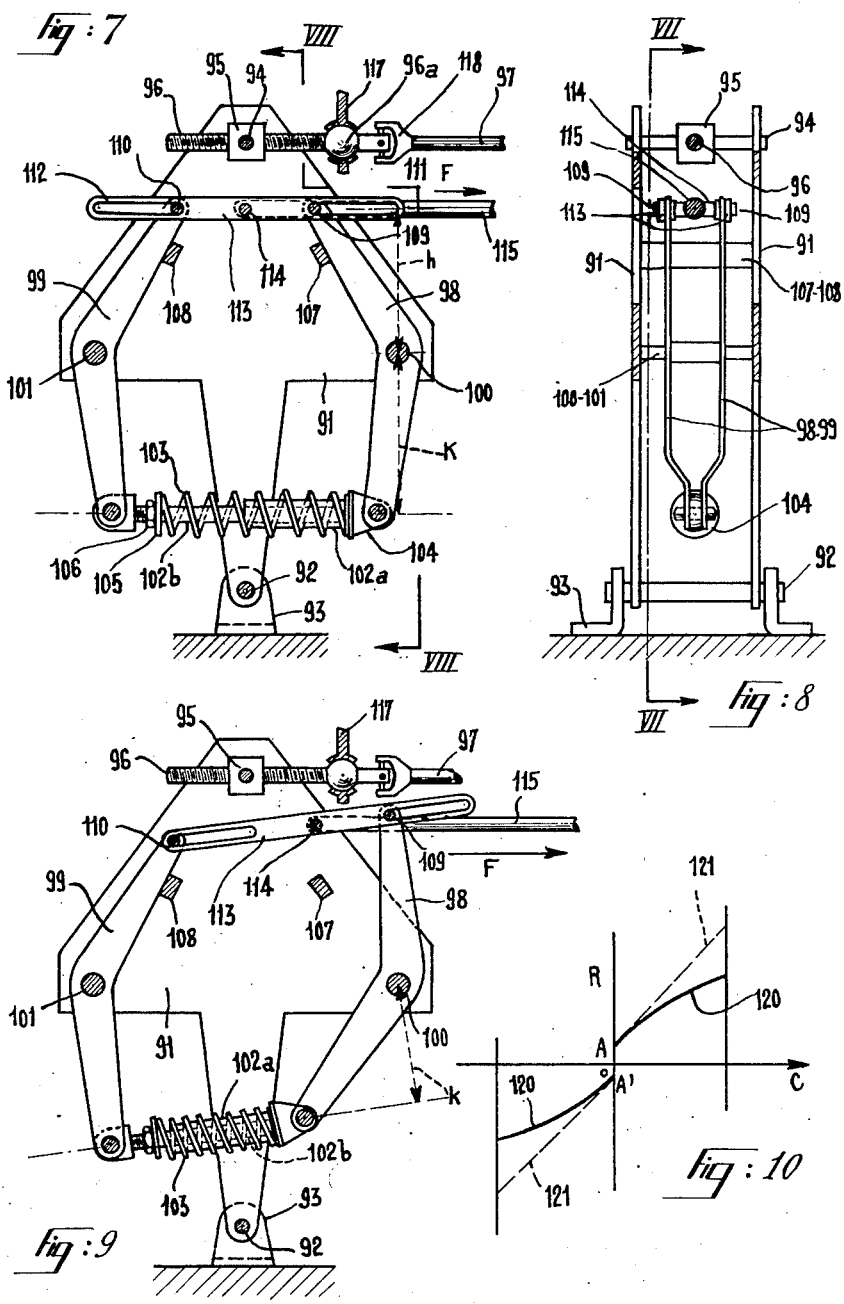

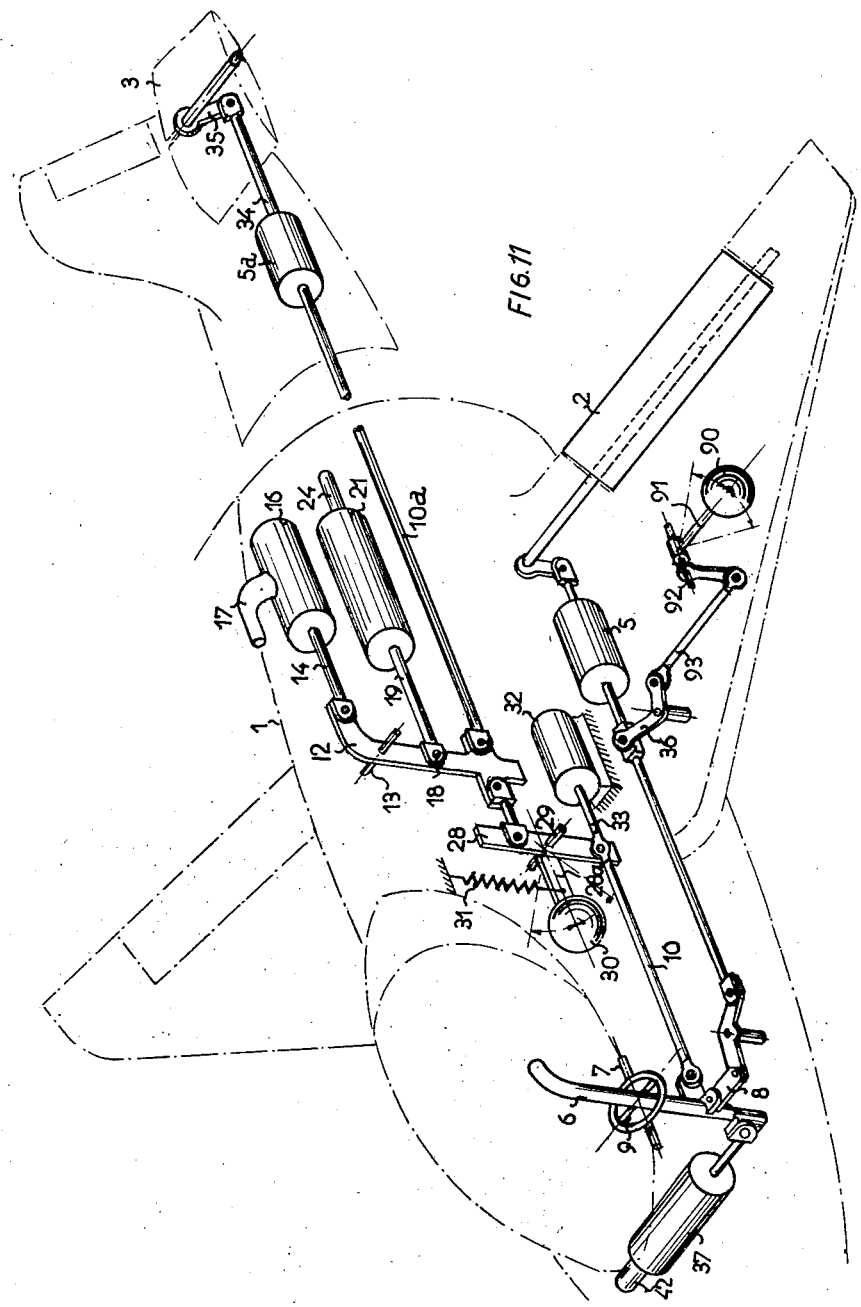

United States Patent Office 2,797,882
Patented July 2, 1957

2,797,882

AIRCRAFT CONTROL SYSTEM

Lucien Servanty, Paris, France, assignor to Societe Nationale de Constructions Aeronautiques du Sud-Ouest (Societe Anonyme), Paris, France, a French company Application June 4, 1952, Serial No. 291,600

2 Claims. (Cl. 244—76)

It is known that aircraft are piloted by means of adjustable surfaces, generally called "control surfaces," which are intended to modify the aerodynamic characteristics of the aerofoils.

In aircraft of the usual construction, the member or members by means of which the pilot acts on the said adjustable surfaces are connected to the said surfaces by reversible transmissions in order to ensure stability of the aircraft when the said control surfaces are freed after having been balanced by means of adjustable compensators. In fact, an action on the control surfaces through the piloting or control members during stable flight results in aerodynamic reactions being exerted on the said control surfaces, such reactions tending to return them to their initial position and consequently producing on the piloting member a return force which is directed oppositely to the movement which has been imparted thereto. Conversely, accidental variation of any one of the parameters of flight of the aircraft produces on the aircraft and consequently on the said control surfaces aerodynamic reactions which produce a subsequent movement of the aircraft and a displacement of the said control surfaces in relation to the aircraft of such direction and amplitude that the machine is restored to the initial conditions of flight at the end of a variable period of time.

Now, owing to the increase in the speed and dimensions of aircraft, the aerodynamic reactions exerted on the control surfaces become considerable and render piloting strenuous.

In order to reduce these reactions, it has been proposed to provide the control surfaces with devices (trim-tabs, Flettner flaps and the like) for compensating for these aerodynamic reactions, which devices provide either regulatable correction of, or an automatic partial compensation for, these aerodynamic reactions. In addition, it has been proposed, for the purpose of avoiding vibrations, to balance the control surfaces about their axes by means of balancing masses, which may in turn be arranged as aerodynamic compensators.

However, at very high speeds equal to and sometimes greater than that of sound, these arrangements are unsatisfactory, since at such speeds the aerodynamic reactions produced on the aircraft and on the control surfaces by accidental variation of any of the parameters of flight generally cannot be so regulated that the movements which result therefrom restore the machine to the initial conditions of flight, in view of the irregularity of the aerodynamic characteristics of the aircraft, and of the control surfaces in the neighbourhood of the speed of sound. Moreover, the use of balancing masses for the purpose of eliminating the danger of vibration involves a prohibitive increase in weight and impairs the purity of the profiles.

The primary object of this invention is to provide an improved control system for the control surface or surfaces of a dirigible aircraft, which will insure stable flight in a wide range of conditions, and in which the use of conventional compensating or trim devices is or may be eliminated.

Another object is to provide a control system for the purpose above specified, wherein the control motions of a control member are transmited to said control surface or surfaces by means of a power actuated irreversible servomotor unit, said control system comprising restoring means associated with said control member and adapted, on release of the control member following any displacement thereof, to restore the control member to its neutral or reference position and thereby restore the control surface to a corresponding position of equilibrium or trim, and means responsive to flight attitude and condition of the aircraft also associated with said control member to cooperate with said restoring means in bringing the control surface automatically to its desired position of equilibrium.

The term "irreversible" is not used in the sense that the servo-motor unit cannot be caused to operate in opposite directions, but in the sense that transmission to the control member of the aerodynamic forces exerted on the control surface is prevented.

Other objects of the invention will appear from the specification.

The invention consists in certain novel features as herein shown and described, and as indicated in the appended claims.

In the drawings:

Figures 2, 3 and 4 show diagrammatically the details of this arrangement for elevator control, warping control and rudder control respectively.

Figure 5 shows half in section and half in elevation an elastic device intended to provide all or some of the necessary efforts.

Figure 6 shows diagrammatically an irreversible hydraulic servo-motor.

Fig. 7 shows another elastic device; this figure is taken along line VII—VII of Fig. 8.

Fig. 8 is the cross-section according to line VIII—VIII of Fig. 7.

Fig. 9 similar to Fig. 7 shows the same device distorted by a force applied on the control means.

Fig. 10 is a diagram of the elastic forces in accordance with the displacement of the control means.

Fig. 11 is a diagrammatic view in perspective of the means for controlling the ailerons and stabilizers or elevators.

Figure 1:
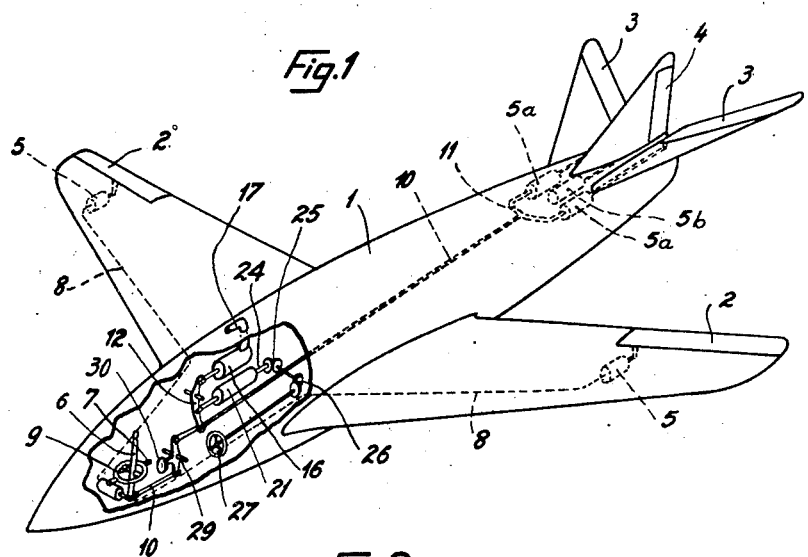
Figure 1 is a diagrammatic view in perspective of an aircraft to which one embodiment of the means for controlling control surfaces in accordance with the invention is applied.

The aircraft 1 shown in Figure 1 comprises in known manner five control surfaces intended to provide all the possible piloting controls. The said control surfaces are, respectively, the ailerons 2, the stabilisers 3 and the rudder 4, said control surfaces being operated by an irreversible servo-motor 5, 5a and 5b situated in the immediate vicinity of said surfaces. The said servo-motors are controlled by the pilot's controls.

Figure 1 shows diagrammatically the control stick 6 by means of which the ailerons 2 and the stabilisers 3 can be simultaneously actuated. To control the ailerons 2, the control stick 6 can be inclined laterally about a pin 7 and it acts on the servo-motors 5 corresponding to the said ailerons through linkages diagrammatically represented by the chain lines 8 and illustrated in simplified form in Figures 3 and 11. To control the stabilisers 3, the control stick can be rocked backwards and forwards about a pin 9 and it acts on the two servo-motors 5a corresponding to the two stabilisers or elevators 3 by means of a linkage 10 forming at its rear end a rigid T 11 in order thus to act on the two servo-motors corresponding to said stabilisers.

If the tail unit is flat, a single servo-motor 5a can simultaneously control the two stabilisers, the axes of oscillation of which are in this case coincident.

In Figure 1, the rudder-bar controlling the servo-motor 5b of the rudder 4 is not shown. A diagrammatic illustration of this control is given in Figure 4.

The various controls acting on the irreversible servo-motors comprise devices intended to exert on these controls stresses of suitable direction and magnitude to ensure stability of the machine.

Figure 2:
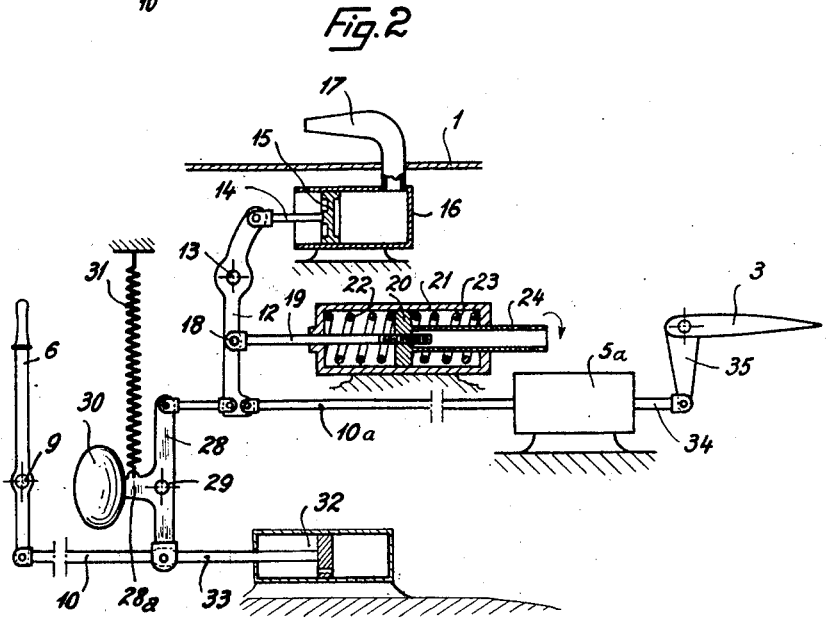

As will be seen in greater detail in Figures 2 and 11, the linkage 10, 10a by which the control stick 6 is connected to the servo-motors 5a controlling the stabilisers 3 comprises at a point along its path a lever 12 pivoting about a pin 13. The upper end of the said lever is pivoted to a rod 14 connected to a piston 15 movable in a cylinder 16 in which a total pressure intake 17 sets up the aerodynamic pressure corresponding to the speed of flight. In addition, the lever 12 is connected at the point 18 to a rod 19 having a screw-threaded end extending within a cylinder 21 so as to engage a threaded axial bore provided in a disc 20 adapted to slide freely in a cylinder 21, which is fixed. By bearing against the ends of the said cylinder, the springs 22 and 23 act in opposite directions on the two faces of the disc. The disc 20 is carried by a slidable and rotatable tube 24 extending through an end wall of cylinder 21, the arrangement being such that by rotating the tube 24 said disc is axially displaced along the threaded end of rod 19. In Figure 1, the tube 24 is rotated through gearing systems 25 and 26 by means of a hand wheel 27 accessible to the pilot during flight.

Also interposed in the linkage 10, 10a is a lever 28 rocking about a pin 29 parallel to the span of the wing of the aircraft, which lever supports a balance mass 30 on the end of an arm 28a extending in the direction of flight. The weight of the said balance mass may be compensated for by a long spring 31. Finally, a conventional pneumatic or hydraulic dampening device 32 may be mounted on the aircraft structure and connected to the linkage 10, 10a by a rod 33 to brake the movements of the said linkage.

It will be assumed that each servo-motor 5a is adapted to convert an axial movement of the linkage 10 through a lever 10a into an equal axial movement of the rod 34 (Fig. 2) extending from the said servo-motor 5a and acting on the lever 35 of one of the stabilisers 3, but the said rod 34 cannot move spontaneously and consequently transmit an effort to the linkage 10, 10a. A constructional example of such an irreversible servo-motor will be described with reference to Figure 6.

Under these conditions, the arrangement hereinbefore described operates as follows:

When the pilot exerts a pull or a push on the lever 6, the movement which it produces is transmitted by the linkage 10, 10a to each irreversible servo-motor 5, which converts it into a modification of the deflection of the stabiliser 3. The aerodynamic reactions developed on this stabiliser are not transmitted to the control stick 6 by reason of the irreversibility of the servo-motors 5a. On the other hand, control motion of lever 6 is being transmitted to the disc 20 causing the latter to slide in cylinder 21 and to thereby compress one of the springs 22 or 23 and it will readily be seen that the spring thus deformed exerts on the lever 12 and linkage 10 a force which tends to return the control stick 6 and therefore the control surface to its initial position.

Conversely, the disc 20 being so adjusted that the machine flies with a predetermined attitude and velocity with the control stick free, any variation of these flight conditions sets up variations in the speed along the flight path and in the acceleration, which variations act on the mass 30 and the piston 15 so as to set up forces tending to move the control surface independently of the aerodynamic reactions applied thereto, in such a direction that the machine is rapidly returned to its condition of equilibrium. For example, an accidental increase in speed brings about an increase in the pressure obtaining in the cylinder 16. The piston 15 then moves and drives the control surface through the linkage 10, 10a and the servo-motor 5a in a direction such as to bring about a reduction in the speed of the aircraft by causing the latter to climb.

The piston 15 may, if desired, be subjected to the action of a return spring acting in opposition to the effort provided by the air pressure, so that the reaction due to the speed is compensated for for a given attitude of flight. It is thus possible to choose the law in accordance with which this reaction varies in a substantially arbitrary manner.

The action of the mass 30 is similar. If, under the same conditions as hereinbefore described, the aircraft accidentally commences to flatten out, the acceleration produced by this flattening out, acting on the mass 30, brings about a displacement of the control 10, 10a and of the control surface 3 through the servo-motor 5a in a direction such that the said flattening out is stopped and the machine is returned to its initial balanced flight.

In the diagrammatic illustration of the banking control shown in Figure 3, the control stick 6 acts differentially, by pivoting laterally about the pin 7, on the ailerons 2 through the rigid linkages 8, the bell crank levers 36 and the irreversible servo-motors 5. The end of the control stick 6 is connected to an elastic device 37 similar to that shown at 21 in Figure 2, which device tends to maintain the control stick 6 in the mean position. Action on the said control stick therefore produces a differential warping of the two ailerons and at the same time an elastic reaction which tends to return the said control stick into the mean position.

It is advantageous to complete the action of the elastic devices 37 by devices reacting to the accelerations due to the rotation of the aircraft about its longitudinal axis (rolling movement). The said devices may consist of at least one mass 122 mounted on an arm 123 extending in the direction of the wing span, which arm can pivot about a fixed pin 124 parallel to the longitudinal axis of the aircraft. The said mass can act through the linkage 125 on the linkage 8. In order to increase the effectiveness of the said devices, the mass or masses 122 are positioned as far as possible from the longitudinal axis of the aircraft, that is to say towards the wing tips and, for obvious reasons of balancing, two symmetrically disposed masses are preferably employed. It will readily be seen that the commencement of a rolling movement will produce on the transmission system 8 and consequently on the control surfaces and the control stick reactions which tend to nullify the movement commenced.

In the diagrammatic illustration of the rudder control shown in Figure 4 the rocking lever 38 controlled at the base, for example, operates through the linkage 39 the servo-motor 5b which, through a control lever 40, deflects the rudder 4. At the same time, the movement of the said rocking lever acts on the elastic device 41, which is also of the same type as the elastic device shown in Figure 2 and which tends to return the rocking lever into the centre position. As before, there may be attached to the linkages 39 devices providing efforts dependent upon the parameters of flight.

Thus, due to the arrangements shown in Figures 2, 3 and 4, the piloting devices allow of acting positively on the control surfaces and when the deflection of the latter has been determined these control surfaces are fixed in relation to the aircraft owing to the irreversibility of the servo-motors, and they are therefore unable to vibrate. Nevertheless, due to the reactions artificially set up by the devices hereinbefore described, the pilot can feel the reactions on the said control surfaces and can pilot his plane in the normal manner. Moreover, the said reactions ensure stability of the aircraft when the piloting members are released (piloting with the control stick free). In other words, while in a normal aircraft the control surfaces can take up their position of equilibrium at any instant due to the reversibility of the control by which their position is modified, in the arrangement according to the invention, the position of equilibrium of these control surfaces is imparted thereto by the artificially created reactions which are substituted for the natural reactions of the said control surfaces in order to control the position of equilibrium and the movements thereof. The combination of devices producing the artificial reactions therefore constitutes an automatic aircraft stabiliser. Since the value of these reactions and the damping thereof can be arbitrarily chosen, it is possible to influence at will the conditions of stability of the aircraft.

It will be seen that since the reactions thus artificially created are independent of the true aerodynamic reactions developed on the control surfaces, they are always exerted in the required direction. The stability thus obtained is therefore independent of the irregularities and even of the anomalies which may arise at very high speed in the natural aerodynamic reactions of the control surfaces. This means that the sound barrier can be passed through without difficulties.

In the arrangements shown in Figures 3 and 4 it is possible, by rotating the tubes 42, with any given deflection of a control surface, to bring the piloting member into the mean position. Thus, whatever the conditions of flight, the pilot can fly his aircraft with the control stick free. Such an adjustment is therefore equivalent to that of compensator tabs adjustable in flight which are mounted on the control surfaces, without having the disadvantages thereof.

Instead of being constructed as illustrated in Figure 2, that is to say, with two opposing springs, the elastic devices can advantageously be arranged as shown in Figure 5, with only a single spring which is alternately acted on at each of its ends according to the direction of movement of the piloting member.

The device shown in this figure comprises a cylindrical external jacket 43 secured to the body of the aircraft. Enclosed in this jacket is the spring 44, which replaces the two springs 22 and 32. The ends of the said spring bear against dished annular members 45 and 46, arranged to slide in the cylinder 43, the said dished members abutting against the screw threaded sleeves 47 and 48, respectively, which are screwed on the ends of the cylinder 43. Arranged coaxially with the cylinder 43 is a tubular member 49 which extends entirely through the cylinder 43 and comprises, near to its ends, screwthreads on which are screwed the sleeves 50 and 51 respectively, which are freely movable within the sleeves 47 and 48 respectively. Those ends of the sleeves 50 and 51 which are nearer the interior of the cylinder 43, bear against the dished members 45 and 46 through ball thrust bearings 52 and 53. Screwed within the tubular member 49 is a cylinder 54 provided with a member 55 for securing it to one of the piloting members. The tubular member 49, which is equivalent in its operation to the tube 24 shown in Figure 2, is provided at its free end with a cylindrical lining 56 in which is formed a long diametral slot 57 due to which the said tube can be rotated by means of a flat rotative rod forming a turnscrew, engaged in the said slot. The lining 56 is secured to the tubular member by the rivet 58, while the sleeves 50 and 51 are prevented from being accidentally unscrewed by means of lock nuts 59, which are in turn retained by steel wire locking members 60.

When the piloting member coupled with the cylinder 54 produces an axial displacement of the tubular member 49, for example to the right, the sleeve 50 fast with the said tubular member compresses the spring 44 to the right through the ball thrust bearing 52 of the dished member 45. The dished member 46 and the thrust bearing 53 in turn remain fixed, while the sleeve 51 also fast with the tubular member, moves away from the latter thrust bearing. Conversely, in the event of movement of the tubular member 49 to the left, the dished member 45 remains stationary while the dished member 46 subjected to the thrust of the sleeve 51 compresses the spring.

Thus, the single spring 44 produces, in the two possible directions of movement of the tubular member 49, absolutely equal elastic reactions for equal movements of opposite direction of the said tubular member. Moreover, owing to the initial adjustments of the position of the spring 44 and of the compression thereof, the mean or zero position of the tubular member 49 is defined without tolerance the spring 44 becoming operative for a very small movement to either side of the said mean position.

When it is desired to vary the position of the piloting member in relation to the said elastic device, the tubular member 49 is rotated by means of the turnscrew, this rotation being permitted by the thrust bearings 52 and 53. As a result of this movement, the cylinder 54 is screwed in one direction or the other within the said tubular member, because the said cylinder cannot turn by reason of the fact that it is connected to the piloting member.

It is thus possible, as shown in Figure 1, to adjust the position of equilibrium of the piloting member and of the control surfaces in flight by means of a hand wheel 27.

However, it will be noted that the device shown in Fig. 5 yields elastic reactions which are proportional to the control displacements. It is sometimes found necessary, in order to improve the stability of the craft, to provide for a non-linear relationship between the magnitude of the reaction or follow-up force, and the amount of control displacement. Specifically, it is in many cases desirable that the follow-up force increases at a lower rate than does the magnitude of the control displacement. Such a result may be obtained, according to the invention, with the arrangement shown in Figs. 7 and 8. This arrangement comprises, as shown, a pair of identical flange members 91 supported in parallel spaced relationship and adapted to swing bodily about a shaft 92 extending through the bottom of the flanges and supported on a fixed support 93 on the aircraft. The tops of the flanges are interconnected by a rod 94 having a nut 95 secured to it in which a screw-rod 96 is engaged, the screw-rod 96 being rotatable through a transmission linkage 97 from a control member, such as handwheel 27 shown in Fig. 1, within convenient reach of the pilot. The head 96a of screw rod 96 is swivelled in a fixed ball-socket 117, and a cardan joint 118 is provided for operatively connecting the linkage 97 to the screw in any position of the latter.

Mounted between the side flanges 91 are two double bell-crank levers 98 and 99 respectively pivoted on pins 100 and 101 secured to the flanges. The lower ends of double levers 98, 99 define a pair of clevises which are pivotally coupled to the free ends of two telescopically interengaging parts 102a and 102b of an expansible rod. Surrounding this rod is a compression spring 103 which has one end abutted against a shoulder 104 of the part 102a and its other end against a disc 105 adjustable in position along the part 102b by means of a nut 106. This nut therefore makes it possible to adjust the initial compression of spring 103. The force of spring 103 applies the ends of each of the levers 98 and 99 against respective stops 107 and 108.

The outer faces of the double levers 98, 99 at the upper ends thereof are provided with projecting pins 109, 110 respectively engaging elongated slots 111, 112 formed in a pair of similar plates 113 applied against the outer faces of the levers. The plates are rigidly interconnected at their centres by a rod 114 which supports for pivotal movement one end of a link 115 connected to the pilot's control member and serving a similar purpose to the link 19 for example, shown in Fig. 2.

In the idle condition of the device shown in Fig. 7, the pins 109 and 110 are in contact with the innermost ends of the slots 111, 112 respectively.

Considering for example lever 98, it will be seen that initially the leverage corresponding to link 115 is equal to $h$, whereas the leverage corresponding to spring 103 is equal to $K$. If an action exerted on the pilot's control (such as the control stick or rudder bar) causes a displacement of link 115 in the direction of arrow F for example, then such action, transmitted by the pair of plates 113 and pins 109 to lever 98, will tend to rotate this lever clockwise, thereby compressing the spring 103. During this movement, the lever 99 remains stationary in contact with the stop 108, since the pin 110 slides in the slot 112. Thus it is seen that the lever 99 serves as a fixed abutment for the left hand end of spring 103.

The rotation of lever 98 is adapted gradually to bring this lever to the end position shown in Fig. 9.

It can readily be seen that in this movement, the leverage $h$ is ever-increasing, and conversely that the leverage $K$ is ever-decreasing until it finally reaches the value $k$. This opposite variation of the lever arms occurs in a similar manner if the link 115 is actuated in the direction opposite from that shown by arrow F, except that in this case the lever 98 would remain stationary, while lever 99 would be rocked counterclockwise.

Owing to the above-described variable leverage, the reaction exerted on the pilot's control by the spring 103 is not proportional to the displacement of the control. In the example illustrated, the reaction R follows a law of variation similar to that represented by the full-line curve 120 in Fig. 10, as plotted against the displacement C of the control, whereas the reaction of the follow-up devices shown in Fig. 5 may be represented by the dotted line curve 121.

Moreover, the nut 106 for adjusting the initial compression of spring 103 makes it possible to adjust the elastic force required for restoring the control member to its mean position irrespective of friction forces developed throughout the transmission; such initial compression will result in the presence of a certain initial or "threshold" force required for initiating the displacement of the control member in either direction. This "threshold" force will be the lower as friction and other passive resistance forces throughout the control transmission are lower.

Finally, rotation of rod 97 around its axis will swing the device bodily about the axis 92. This makes it possible to restore the levers 98 and 99 into engagement with their stops 107 and 108 in order to eliminate an elastic reaction present on the control, i. e. to stabilize in position a control surface previously displaced by means of said control. Thus, the device of Figs. 7 and 8 is adapted for use as a trim control for stabilizing a control surface in a desired displaced condition, as described in connection with the device of Fig. 5.

Figure 6 shows an example of an irreversible hydraulic servo-motor suitable for use in the piloting arrangement according to the invention. This device, which is shown simply by way of example, does not form part of the invention and could be replaced by any other equivalent hydraulic or even electric device.

The hydraulic servo-motor shown in this figure is a jack enclosed in a cylinder 61 divided into two compartments 61a and 61b by a partition 62, through which the rod 64 of the piston of the said jack extends in fluid-tight manner by means of a packing 63, the said rod being connected to the control surface to be operated. The compartment 61a communicates through the branch pipe 65 with a source of fluid under high pressure 87, while the compartment 61b communicates through the branch pipe 66 with a reservoir 88 containing fluid under no pressure and communicating through a return conduit 89a comprising a pump 89 with the source of fluid under pressure.

The piston 67 of the jack can slide in the left hand part of the compartment 61a and defines therein two spaces $61'a$, $61''a$. The said piston has an axial bore 75 into which there penetrate the rod 68 forming the end of the linkage connected to a piloting member. The said rod extends through one of the ends of the cylinder 61 by way of a fluid-tight packing 69, while the rod 64 extends through the other end by way of a fluid-tight packing 70.

The rod has two frusto-conical sections 71 and 72 of opposite direction, which determine a narrowed portion 68a on the said rod. Provided on the said narrowed portion are two shoulders 73 bounding a packing 74 forming a movable fluid-tight partition in the axial bore 75.

The rod 68 is terminated in the end of the piston by a widened portion in the form of a plate 76 having passages 77 formed therein. The said plate is enclosed in a widened section 78 in the end of the axial bore of the piston, so that the rod 68 can move axially through a short distance in relation to the said piston. Calibrated orifices 79 afford communication between the space situated to the right of the partition 74 in the axial passage 75 and the passage 80 which is formed in the rod of the piston 64 and leads into the space 61b.

The inclined surface 71 cooperates with a ball 81 which is in turn in contact with a ball 82 forming a valve. The ball 82 enables the space $61'a$ to be placed in communication with that part of the axial passage 75 which is situated to the left of the partition 74. The inclined surface 72 co-operates in turn with a ball 83 in contact with the ball valve 84 which enables the space situated to the right of the partition 74 to be placed in communication with the compartment $61'$ by means of a passage 85.

As shown in the figure, in order to facilitate the establishment of these various intercommunications, the piston 67 is preferably made in a number of parts joined together in any desired manner.

The operation of the jack hereinbefore described is as follows:

It will be assumed that a piloting member is actuated by a push exerted on the rod 68 in the direction of the arrow F.

In this movement the inclined surface 71 forces back the ball valve 82 while the orifice closed by the ball 84 remains closed because the inclined surface 72 has moved away from the ball 83. The pressure of the fluid entering through the orifice 65 can thus be simultaneously exerted from both sides of the piston 67 in the two spaces $61'a$ and $61''a$.

Since the useful right-hand section of the piston 67 is smaller than the useful left-hand section of the same piston, owing to the presence of the rod 64, the piston 67 moves to the right, that is to say in the direction of the arrow F, and this movement continues as long as the surface 71 of the rod 68 maintains the ball 82 in the lifted position that is to say, as long as an effort is exerted in the direction of the arrow F in order to move the rod 68. As soon as this effort ceases and the movement of the rod 68 is stopped, the piston 67 is held fast.

In the course of the movement of the piston a transfer of oil takes place from the space $61''a$ to the space $61'a$ while at the same time oil arrives through the passage 65, but no oil leaves the compartment 61b through the discharge orifice 66.

If, on the other hand, the effort exerted on the rod 68 is directed in the direction of the arrow F', the ball 82 remains in position while the ball 83, which is moved, frees the orifice which it is masking. Consequently, the space $61'a$ is placed in communication with the compartment 61b through the passage 85, the part situated to the right of the partition 74 of the axial bore, the orifices 77 and 79 and the passage 80. As the pressure exerted on the right hand face of the piston 67 is maintained due to the permanent connection of the space 61″a with the orifice 65, the said piston moves to the left and the oil is discharged from the compartment 61a to the compartment 61b and towards the outlet orifice 66.

As before, this movement continues as long as an effort is exerted on the rod 68 in the direction of the arrow F′.

As will be seen, the operation of the jack is different in the two directions. It is nevertheless possible to equalise the efforts in the two directions by adjusting the dimensions of the bores 77 and 79 so as to influence the loss of pressure of the flow of liquid from the space 61′a to the outlet orifice.

It will be found in practice that the piston of such a servomotor follows, with a practically negligible lag, the movement of the control rod, that it converts this movement into an effort of a value limited only by the pressure of the driving fluid and the dimensions of the said piston, and that in addition the said servomotor is irreversible since the spaces situated on each side of the piston 67 are filled with oil and closed when the rod 68 is stationary.

The source of pressure 87 is preferably a hydro-pneumatic accumulator in which a constant high pressure is maintained so as to obtain a regular operation. For reasons of safety, it is advantageous to double the hydraulic connections by which each of the servomotors is connected to the said accumulator, and if necessary to the oil reservoir and to make these conduits independent of one another. Suitably arranged valves or stop cocks may be provided to cut off defective sections of conduits.

Finally, in order to afford complete safety in the event of all the pressure sources or conduits being out of use, means may be provided to lock the rod 68 in the piston 67 so that the control can be directly exerted, that is to say, without the aid of the servomotor, from the piloting member to the control surface to be actuated.

In the arrangement illustrated, it will be seen that the terminal plate 76 of the rod 68 provides this locking action itself, although leaving a certain tolerance in the transmission. In this case, the connection of the piloting member to the control surface becomes reversible as in the usual aircraft.

It will be obvious that modifications may be made to the method and means hereinbefore described, notably by substitution of equivalent technical means, without departing from the scope of the present invention.

What I claim is:

1. In an aircraft having a surface for controlling the attitude of the aircraft with respect to its transverse axis and another surface for controlling the attitude of the aircraft with respect to its longitudinal axis, a control system for selectively controlling the operation of said control surfaces for separate or concurrent operation including, in combination, a manual control member mounted for universal movement, a first power-actuated irreversible servomotor unit connected to said control member and to the first named surface for moving the same in response to the control motions of said control member from a neutral position in either one of two opposite directions, a second power-actuated irreversible servomotor unit connected to said control member and to said other surface for moving the same in response to the control motions of said control member from said neutral position in either one of two opposite directions substantially at right angles to the first named directions, spring means operatively connected with said control member for opposing control motion thereof in either of two of the said directions which control the attitude of the aircraft with respect to its transverse axis with a force proportional to the magnitude of said control motions, a cylinder having a piston therein, an operative connection between said piston and said control member, a forwardly opening tube carried externally of said aircraft and connected to said cylinder for admitting air pressure on one side of said piston so as to create a force proportional to the magnitude of the speed of the aircraft, said force being transmitted by said operative connection from said piston to said control member in such manner that said force opposes motion of said control member in one of said first named directions but assists or causes motion of said control member in the other of said first named directions, an inertia mass responsive to the acceleration of the aircraft about said transverse axis interconnected between said first servomotor unit and said control member to assist or to cause motion thereof in the direction opposed by said force when said acceleration exceeds a determined value, and an inertia mass responsive to the acceleration of the aircraft about said longitudinal axis interconnected between said second servomotor unit and said control member to assist or to cause motion thereof toward said neutral position when said last named acceleration exceeds a determined value.

2. In an aircraft having rudder, aileron, and elevator control surfaces for controlling the movement of said aircraft about turn, bank, and pitch axes, respectively, a control system for selectively controlling the operation of said surfaces for separate or concurrent operation including, in combination, control means adapted to be moved from and toward a neutral position, power-actuated irreversible servomotor means connected to said control means and to said control surfaces for moving the same in response to the control motions of said control means, resilient means operatively associated with said control means for opposing control motions thereof from said neutral position with a force proportional to the magnitude of said control motions, a cylinder having a piston therein, an operative connection between said piston and said control means, a forwardly opening tube carried externally of said aircraft and connected to said cylinder for admitting air pressure on one side of said piston so as to create a force proportional to the magnitude of the speed of the aircraft, said force being transmitted by said operative connection from said piston to said control means in such manner that said force opposes motion of said control means for operating said elevator control surface but assists or causes motion of said control means back to said neutral position, an inertia mass responsive to the acceleration of the aircraft about said pitch axis interconnected between the servomotor means connected to said elevator control surface and said control means to assist or to cause motion thereof in the direction opposed by said force when said acceleration exceeds a determined value, and an inertia mass responsive to the acceleration of the aircraft about said bank axis interconnected between the servomotor means connected to said aileron control surfaces and said control means to assist or to cause motion thereof toward said neutral position when the last named acceleration exceeds a determined value.

References Cited in the file of this patent

UNITED STATES PATENTS

| | | |
|---|---|---|
| 2,092,424 | Potez | Sept. 7, 1937 |
| 2,227,375 | Carlson | Dec. 31, 1940 |
| 2,227,784 | Kock | Jan. 7, 1941 |
| 2,297,412 | Hoppe | Sept. 29, 1942 |
| 2,445,343 | Tyra | July 20, 1948 |
| 2,630,284 | Feeney | Mar. 3, 1953 |
| 2,661,169 | Ashkenas | Dec. 1, 1953 |

FOREIGN PATENTS

| | | |
|---|---|---|
| 479,981 | Canada | Jan. 1, 1952 |
| 569,290 | Great Britain | May 16, 1945 |